(12) United States Patent
Lorenz et al.

(10) Patent No.: US 7,662,882 B2
(45) Date of Patent: Feb. 16, 2010

(54) DEFOAMING AGENT FOR CEMENTITIOUS COMPOSITIONS

(75) Inventors: Klaus Lorenz, Trostberg (DE); Minoru Yaguchi, Fujisawa (JP); Tomomi Sugiyama, Chigasaki (JP); Gerhard Albrecht, Tacherting (DE)

(73) Assignee: Construction Research & Technology GmbH, Trostberg (DE)

( * ) Notice: Subject to any disclaimer, the term of this patent is extended or adjusted under 35 U.S.C. 154(b) by 713 days.

(21) Appl. No.: 10/534,606

(22) PCT Filed: Nov. 25, 2002

(86) PCT No.: PCT/EP02/13328

§ 371 (c)(1),
(2), (4) Date: Feb. 22, 2006

(87) PCT Pub. No.: WO2004/048293

PCT Pub. Date: Jun. 10, 2004

(65) Prior Publication Data

US 2006/0148976 A1    Jul. 6, 2006

(51) Int. Cl.
*C08L 31/00* (2006.01)
*C04B 40/00* (2006.01)

(52) U.S. Cl. .................. 524/556; 106/819; 106/823

(58) Field of Classification Search .................. 524/556; 106/819, 823
See application file for complete search history.

(56) References Cited

U.S. PATENT DOCUMENTS

| 5,661,206 A | 8/1997 | Tanaka et al. |
| 2006/0124034 A1* | 6/2006 | Okazawa et al. ............ 106/823 |

FOREIGN PATENT DOCUMENTS

| EP | 0 640 384 A | 3/1995 |
| EP | 0 640 384 A1 * | 3/1995 |
| WO | WO 01 42162 A | 6/2001 |

* cited by examiner

*Primary Examiner*—Robert D. Harlan
(74) *Attorney, Agent, or Firm*—Curatolo Sidoti Co., LPA; Joseph G Curatolo; D. Ari Sherwin

(57) ABSTRACT

A defoaming agent for cementitious compositions is provided, which has an excellent defoaming performance and does not segregate when mixed with a high performance AE water-reducing agent to form a single admixture or when diluted in water at the desired concentration, and which has excellent long term storage properties. The defoaming agent for cementitious compositions is obtained by mixing at least a polyethylene oxide derivative and a nonionic defoaming agent wherein the polyethylene oxide derivative has at one end a hydrophobic group with a branched structure and/or an unsaturated bond and at the other end an anionic group.

20 Claims, No Drawings

DEFOAMING AGENT FOR CEMENTITIOUS COMPOSITIONS

CROSS REFERENCE TO RELATED APPLICATIONS

This application is a national stage application of International Application No. PCT/EP2002/013328 filed 25 Nov. 2002, from which application priority is claimed.

The present invention relates to a defoaming agent used for producing cementitious compositions such as concrete, mortar, cement paste and cement milk.

When polycarboxylate-type high performance air-entraining (AE) water-reducing agents are used in cementitious compositions such as concrete, mortar, cement paste and cement milk, they tend to entrain an unacceptably large amount of air. To overcome this, defoaming agents such as silicon, fatty acid ester and polyester types have commonly been used to control the amount of air within a desired range. However, since extremely small amounts of these defoaming agents have an intense defoaming effect, it has been preferred either to dissolve the defoaming agent in water at the desired concentration, or to combine the defoaming agent with the polycarboxylate-type high performance AE water-reducing agent in a one-pack admixture.

However, when such a defoaming agent is used as a one-pack admixture with a polycarboxylate-type high performance AE water-reducing agent, there is often the problem that the blending is not adequate out and segregation occurs. In order to avoid segregation, a stirring device has to be installed in the storage tank, which is both noisy and adds further costs. The problem of segregation also occurs when diluting such a defoaming agent in water to the desired concentration.

Japanese published Patent Application H07-53249 proposes a polycarboxylate-type high performance AE water-reducing agent that has been prepared with a specific polycarboxylate-type polymer to which a defoaming agent has been added during production.

However, since the amount of air in a cementitious composition varies depending on the material used and the ambient temperature, the amount of defoaming agent necessary for adjusting the right amount of air generally also changes. Thus, if the amount of defoaming agent mixed beforehand by this technique is not correct, there is the problem that the desired amount of air cannot be obtained, which involves the complication of using a separate air adjusting agent to adjust the amount of air.

There is therefore a need for a defoaming agent for cement compositions, which has excellent defoaming performance in cement compositions, and which does not segregate when combined in a one-pack admixture with a high performance AE water-reducing agent or when diluted in water at the desired concentration, and which has excellent long term storage properties.

The invention provides a defoaming agent for cementitious compositions, obtained by mixing at least one polyethylene oxide derivative and at least one nonionic defoaming agent, wherein the polyethylene oxide derivative has at one end a hydrophobic group with at least one of a branched structure and an unsaturated bond, and at the other end an anionic group.

The invention further relates to a method of defoaming a cementitious composition by the addition to the composition of a defoaming agent as hereinabove described.

The invention further relates to the abovementioned defoaming agent for cement compositions, wherein the unsaturated bond is a double bond.

The invention also relates to the abovementioned defoaming agent for cement compositions, wherein the polyethylene oxide derivative is a compound expressed by formula I:

$$X-(EO)_a-Y \quad (I)$$

wherein X is a hydrophobic group with at least one of a branched structure and an unsaturated bond; Y is an anion group; EO is —$CH_2CH_2O$— and a is an integer from 6 to 100.

The invention further relates to the abovementioned defoaming agent for cement compositions, wherein a is an integer from 15 to 60.

The invention also relates to the abovementioned defoaming agent for cement compositions, wherein the hydrophobic group with at least one of a branched structure and an unsaturated bond is expressed by formula II:

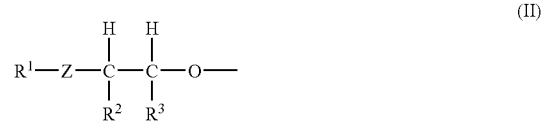

wherein Z is O or an amine; $R^1$, $R^2$ and $R^3$ are each independently alkyl or phenyl, naphthyl, alkenyl, alkylene oxide with 2 to 4 carbon atoms or any derivatives thereof, $R^2$ and $R^3$ may also be each independently a hydrogen atom, with the proviso that $R^1$ is not alkyl when $R^2$ and $R^3$ are both hydrogen atoms.

The invention further relates to the abovementioned defoaming agent for cement compositions, wherein the anion group is —$SO_3M$, —$(CH_2CH_2)OSO_3M$, —$R^4COOM$ (wherein $R^4$ is —$C_mH_{2m}$— (in which m is an integer 10>m>0 and preferably 1 or 2) or a phenyl group), —$PO_3M$ or —$CO(CH_2)_nCOOM$ (wherein M is Na salt, K salt, Ca salt, Mg salt, $NH_4$ salt or H, n is 2 or 3).

The invention also relates to the abovementioned defoaming agent for cement compositions, wherein the nonionic defoaming agent is expressed by formula III:

$$R^5O-(AO)_b-R^6 \quad (III)$$

wherein $R^5$ and $R^6$ are each independently an aliphatic hydrocarbon with 10 to 25 carbon atoms, an alkyl group with 1 to 5 carbon atoms or H; AO is at least one of a block polymer and a random polymer made of alkylene oxide units with 2 to 3 carbon atoms, and b is an integer from 5 to 500.

The invention further relates to the abovementioned defoaming agent for cementitious compositions obtained by mixing the polyethylene oxide derivative and the nonionic defoaming agent at a ratio in the range of 20:80 to 60:40 (wt %).

The invention also relates to the abovementioned defoaming agent for cement compositions, wherein the nonionic defoaming agent, when converted to polyethylene glycol, has a weight average molecular weight in the range from 300 to 30,000 and the weight ratio of the ethylene oxide in said molecular weight is in the range from 5 to 80%.

The polyethylene oxide derivatives used in the present invention have at one end a hydrophobic group with a branched structure and/or an unsaturated bond and at the other end an anionic group, and they can be mixed with commonly used nonionic defoaming agents known to the art without segregation to obtain defoaming agents with a high solution stability.

Moreover, the polyethylene oxide derivatives used in the present invention are expressed by formula (I):

$$X—(EO)_a—Y \quad (I)$$

wherein X is a hydrophobic group with at least one of a branched structure and an unsaturated bond; Y is an anion group and EO is —$CH_2CH_2O$—.

Even though the value for a is not particularly limited, an integer from 6 to 100 is preferred and an integer from 15 to 60 is especially preferred.

If the abovementioned hydrophobic group has an unsaturated bond, it is preferred that the unsaturated bond be a double bond.

The hydrophobic group with a branched structure and/or an unsaturated bond at the end of polyethylene oxide derivatives used in the present invention is preferably a hydrophobic group expressed by formula II:

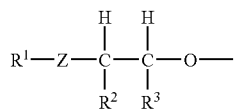

(II)

In formula II, Z is O or an amine; $R^1$, $R^2$ and $R^3$ are each independently alkyl or phenyl, naphthyl, alkenyl, alkylene oxide with 2 to 4 carbon atoms or any derivatives thereof. Further, $R^2$ and $R^3$ may also be each independently a hydrogen atom, with the proviso that $R^1$ is not alkyl when $R^2$ and $R^3$ are both hydrogen atoms.

Examples of the anionic group at the end of the polyethylene oxide derivatives used in the present invention include:

—$SO_3M$,

—$(CH_2CH_2)OSO_3M$,

—$PO_3M$,

—$R^4COOM$ (wherein $R^4$ is —$C_mH_{2m}$— (in which m is an integer 10>m>0 and preferably 1 or 2) or a phenyl group), —$CO(CH_2)_nCOOM$ (wherein n is 2 or 3) and

—COCH=CHCOOM

In the formula given above, it is preferred that M be Na salt, K salt, Ca salt, Mg salt, $NH_4$ salt or H.

The nonionic defoaming agent used in the present invention may be any nonionic defoaming agent known to the art. However, particularly preferred are compounds of formula III:

$$R^5O—(AO)_b—R^6 \quad (III)$$

wherein $R^5$ and $R^6$ are each independently an aliphatic hydrocarbon with 10 to 25 carbon atoms, an alkyl group with 1 to 5 carbon atoms or H; AO is a block polymer and/or a random polymer constituted of alkylene oxide with 2 to 3 carbon atoms, especially preferred are 2 carbon atoms, and b is an integer from 5 to 500.

Even though the ratio in which the polyethylene oxide derivative and the nonionic defoaming agent are mixed to obtain the defoaming agent for cement compositions of the present invention is not particularly limited, the preferred range is 10:90 to 70:30 (wt %), more preferably 20:80 to 60:40 (wt %) and most preferably 20:80 to 50:50 (wt %).

The weight-average molecular weight of the nonionic defoaming agent used in the present invention is not particularly limited, however, when converted to polyethylene glycol, it is preferably in the range of 300 to 30,000, and the weight ratio of the ethylene oxide in the molecular weight of the nonionic defoaming agent is preferably in the range of 10 to 90% and more preferably in the range of 5 to 80%.

One of the major advantages of the defoaming agents of the present invention is that they can be combined with in a one-pack liquid composition, ready for addition to a cementitious composition. The invention therefore provides a water-reducing composition comprising a blend of a polycarboxylate-type high performance air-entraining (AE) water-reducing agent and a defoaming agent as hereinabove described.

The defoaming agent for cement compositions of the present invention can also be combined in a liquid composition together with one or more commonly-used water-reducing agents selected from among lignosulfonate salts, polycarboxylate salts and polysaccharide derivatives.

Even though the amount of defoaming agent for cement compositions of the present invention can be determined as needed, basically it is the amount necessary for adjusting the desired amount of air in a cement composition; an amount in the range of 0.001 to 5 wt % calculated as solids by weight of cement is preferred, and an amount in the range of 0.01 to 0.5 wt % is especially preferred.

The defoaming agent for cement compositions of the present invention may also include other known additives as required. Examples of other additives include conventional air-entraining agents, drying shrinkage reducing agents, accelerators, retarders, foaming agents, defoaming agents, rust preventing agents, quick-setting agents, thickeners and water-soluble high polymeric substances.

The invention is now further described with reference to the following, non-limiting examples.

EXAMPLES

Production Example 1

Production of the Polyethylene Oxide Derivative A-1

13.42 wt. parts of cinnamyl alcohol and 0.05 wt. parts of potassium hydroxide were charged into an autoclave reactor, 11.41 wt. parts of allyl glycidyl ether were slowly added dropwise, whereupon the resulting mixture was reacted for 1 hour at 120° C. 88.0 wt. parts of ethylene oxide were further added and a thick light yellow liquid was obtained after the resulting mixture had been ethoxylated for 2 hours at 120° C. The thick light yellow liquid obtained was transferred to a three-neck flask for sulfation by a commonly-used sulfation method, 10.7 wt. parts of amide sulfate were added and the polyethylene oxide derivative A-1 was obtained by sulfating the resulting mixture in a nitrogen atmosphere for 2 hours at 125° C.

Production Example 2

Production of the Polyethylene Oxide Derivative A-2

14.4 wt. parts of 2-naphthol and 0.05 wt. parts of potassium hydroxide were charged into an autoclave reactor, 11.41 wt. parts of allyl glycidyl ether were slowly added dropwise, whereupon the resulting mixture was reacted for 1 hour at 120° C. 88.0 wt. parts of ethylene oxide were further added and a thick light yellow liquid was obtained after the resulting mixture had been ethoxylated for 2 hours at 120° C. The thick light yellow liquid obtained was transferred to a three-neck flask for sulfation by a commonly used sulfation method, 10.7 wt. parts of amide sulfate were added and the polyethylene oxide derivative A-2 was obtained by sulfating the resulting mixture in a nitrogen atmosphere for 2 hours at 125° C.

Production Example 3

Production of the Polyethylene Oxide Derivative A-3

22.04 wt. parts of 4-nonylphenol and 0.05 wt. parts of potassium hydroxide were charged into an autoclave reactor, 11.41 wt. parts of allyl glycidyl ether were slowly added dropwise, whereupon the resulting mixture was reacted for 1 hour at 120° C. 88.0 wt. parts of ethylene oxide were further added and a thick light yellow liquid was obtained after the resulting mixture had been ethoxylated for 2 hours at 120° C. The thick light yellow liquid obtained was transferred to a three-neck flask for sulfation by a commonly used sulfation method, 10.7 wt. parts of amide sulfate were added and the polyethylene oxide derivative A-3 was obtained by sulfating the resulting mixture in a nitrogen atmosphere for 2 hours at 125° C.

Production Example 4

Production of the Polyethylene Oxide Derivative A-4

22.04 wt. parts of 4-nonylphenol and 0.05 wt. parts of potassium hydroxide were charged into an autoclave reactor, 11.41 wt. parts of allyl glycidyl ether were slowly added dropwise, whereupon the resulting mixture was reacted for 1 hour at 120° C. 44.0 wt. parts of ethylene oxide were further added and a thick light yellow liquid was obtained after the resulting mixture had been ethoxylated for 2 hours at 120° C. The thick light yellow liquid obtained was transferred to a three-neck flask for sulfation by a commonly used sulfation method, 10.7 wt. parts of amide sulfate were added and the polyethylene oxide derivative A-4 was obtained by sulfating the resulting mixture in a nitrogen atmosphere for 2 hours at 125° C.

Production Example 5

Production of the Polyethylene Oxide Derivative A-5

22.04 wt. parts of 4-nonylphenol and 0.05 wt. parts of potassium hydroxide were charged into an autoclave reactor, 11.41 wt. parts of allyl glycidyl ether were slowly added dropwise, whereupon the resulting mixture was reacted for 1 hour at 120° C. 88.0 wt. parts of ethylene oxide were further added and a thick light yellow liquid was obtained after the resulting mixture had been ethoxylated for 2 hours at 120° C. The thick light yellow liquid obtained was transferred to a three-neck flask for sulfation by a commonly used sulfation method, 13.0 wt. parts of succinic anhydride and 0.1 wt. parts of trimethylamine were added in a nitrogen atmosphere and the polyethylene oxide derivative A-5 was obtained by carboxylating the resulting mixture for 2 hours at 50° C.

Production Example 6

Production of the Polyethylene Oxide Derivative A-6

5.81 wt. parts of allyl alcohol and 0.05 wt. parts of potassium hydroxide were charged into an autoclave reactor, 12.0 wt. parts of styrene alcohol were slowly added dropwise, whereupon the resulting mixture was reacted for 1 hour at 120° C. 88.0 wt. parts of ethylene oxide were further added and a thick light yellow liquid was obtained after the resulting mixture had been ethoxylated for 2 hours at 120° C. The thick light yellow liquid obtained was transferred to a three-neck flask for sulfation by a commonly used sulfation method, 10.7 wt. parts of amide sulfate were added and the polyethylene oxide derivative A-6 was obtained by sulfating the resulting mixture in a nitrogen atmosphere for 2 hours at 125° C.

Production Example 7

Production of the Polyethylene Oxide Derivative A-7

5.81 wt. parts of allyl alcohol and 0.05 wt. parts of potassium hydroxide were charged into an autoclave reactor, 19.6 wt. parts of stilbene oxide were slowly added dropwise, whereupon the resulting mixture was reacted for 1 hour at 120° C. 110.0 wt. parts of ethylene oxide were further added and a thick light yellow liquid was obtained after the resulting mixture had been ethoxylated for 2 hours at 120° C. The thick light yellow liquid obtained was transferred to a three-neck flask for phosphorilation by a commonly used method, 16.0 wt. parts of phosphorous trichloride oxide were added in a nitrogen atmosphere and the polyethylene oxide derivative A-7 was obtained by reacting the resulting mixture at 45° C.

Production Example 8

Production of the Polyethylene Oxide Derivative A-8

13.42 wt. parts of 2-allylphenol and 0.05 wt. parts of potassium hydroxide were charged into an autoclave reactor, 11.41 wt. parts of allylglycidylether were slowly added dropwise, whereupon the resulting mixture was reacted for 1 hour at 120° C. 88.0 wt. parts of ethylene oxide were further added and a thick light yellow liquid was obtained after the resulting mixture had been ethoxylated for 2 hours at 120° C. and a pressure of 5 atm. The thick light yellow liquid obtained was transferred to a three-neck flask for sulfation by a commonly used sulfation method, 10.7 wt. parts of amide sulfate were added and the polyethylene oxide derivative A-8 was obtained by sulfating the resulting mixture in a nitrogen atmosphere for 2 hours at 125° C.

Production Example 9

Production of the Polyethylene Oxide Derivative A-9

26.1 wt. parts of 4-nonyl-2-propenylphenol and 0.05 wt. parts of potassium hydroxide were charged into an autoclave reactor, 88.0 wt. parts of ethylene oxide were added and a thick light yellow liquid was obtained after the resulting mixture had been ethoxylated for 2 hours at 120° C. and a pressure of 5 atm. The thick light yellow liquid obtained was transferred to a three-neck flask for sulfation by a commonly used sulfation method, 10.7 wt. parts of amide sulfate were added and the polyethylene oxide derivative A-9 was obtained by sulfating the resulting mixture in a nitrogen atmosphere for 2 hours at 125° C.

Production Example 10

Production of the Polyethylene Oxide Derivative A-10

26.1 wt. parts of 4-nonyl-2-propenylphenol and 0.05 wt. parts of potassium hydroxide were charged into an autoclave reactor, 220.0 wt. parts of ethylene oxide were added and a thick light yellow liquid was obtained after the resulting mixture had been ethoxylated for 2 hours at 120° C. and a pressure of atm. The thick light yellow liquid obtained was transferred to a three-neck flask for sulfation by a commonly used sulfation method, 10.7 wt. parts of amide sulfate were added and the polyethylene oxide derivative A-10 was obtained by sulfating the resulting mixture in a nitrogen atmosphere for 2 hours at 125° C.

Production Example 11

Production of the Polyethylene Oxide Derivative A-11

22.04 wt. parts of 4-nonylphenol and 0.05 wt. parts of potassium hydroxide were charged into an autoclave reactor, 11.41 wt. parts of allylglycidylether were slowly added dropwise, whereupon the resulting mixture was reacted for 1 hour at 120° C. 88.0 wt. parts of ethylene oxide were further added and a thick light yellow liquid was obtained after the resulting mixture had been ethoxylated for 2 hours at 120° C. The thick light yellow liquid obtained was transferred to a three-neck flask for methylation, 10.7 wt. parts of dimethyl sulfate were added and the polyethylene oxide derivative A-11 was obtained by reacting the resulting mixture for 3 hours at 80° C.

Production Example 12

Production of the Polyethylene Oxide Derivative A-12

22.04 wt. parts of 4-nonylphenol, 88 wt. parts of ethylene oxide and 0.05 wt. parts of potassium hydroxide were charged into an autoclave reactor and a thick light yellow liquid was obtained by ethoxylating the resulting mixture for 1 hour at 120° C. The thick light yellow liquid obtained was transferred to a three-neck flask for sulfation by a commonly used sulfation method, 10.7 wt. parts of amide sulfate were added and the polyethylene oxide derivative A-12 was obtained by sulfating the resulting mixture in a nitrogen atmosphere for 2 hours at 125° C.

Production Example 13

Production of the Polyethylene Oxide Derivative A-13

5.81 wt. parts of allyl alcohol and 0.05 wt. parts of potassium hydroxide were charged into an autoclave reactor, 12.02 wt. parts of styrene oxide were gradually added dropwise, whereupon the resulting mixture was reacted for 1 hour at 140° C. 22.0 wt. parts of ethylene oxide were further added and a thick light yellow liquid was obtained by ethoxylating the resulting mixture for 2 hours at 120° C. The thick light yellow liquid obtained was transferred to a three-neck flask for sulfation by a commonly used sulfation method, 10.7 wt. parts of amide sulfate were added and the polyethylene oxide derivative A-13 was obtained by sulfating the resulting mixture in a nitrogen atmosphere for 2 hours at 125° C.

Production Example 14

Production of the Polyethylene Oxide Derivative A-14

24.2 wt. parts of cetyl alcohol, 0.05 wt. parts of potassium hydroxide and 44 wt. parts of ethylene oxide were charged into an autoclave reactor and a thick light yellow liquid was obtained by ethoxylating the resulting mixture for 2 hours at 120° C. The thick light yellow liquid obtained was transferred to a three-neck flask for sulfation by a commonly used sulfation method, 10.7 wt. parts of amide sulfate were added and the polyethylene oxide derivative A-14 was obtained by sulfating the resulting mixture in a nitrogen atmosphere for 2 hours at 125° C.

Production Example 15

Production of the Polyethylene Oxide Derivative A-15

26.1 wt. parts of 4-nonyl-2-propenylphenol, 484 wt. parts of ethylene oxide and 0.05 wt. parts of potassium hydroxide were charged into an autoclave reactor and a colorless solid substance was obtained by ethoxylating the resulting mixture for 1 hour at 150° C. The colorless solid substance obtained was transferred to a three-neck flask for sulfation by a commonly used sulfation method, 10.7 wt. parts of amide sulfate were added and the thick light yellow liquid polyethylene oxide derivative A-15 was obtained by sulfating the resulting mixture in a nitrogen atmosphere for 2 hours at 125° C.

The polyethylene oxide derivatives A-1 to A-15 obtained according to the Production Examples 1 to 15 are expressed by formula IV:

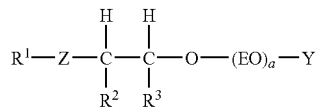

(IV)

wherein the function groups are as shown in Table 1.

TABLE 1

| | The function groups of the polyethylene oxide derivatives A-1 to A15 | | | | | | |
|---|---|---|---|---|---|---|---|
| Compound | $R^1$ | Z | $R^2$ | $R^3$ | | a | Y |
| A-1 | phenyl-CH=CHCH$_2$O— | O | H | CH$_2$=CH—CH$_2$—O—CH$_2$— | | 20 | —SO$_3^-$NH$_4^+$ |
| A-2 | naphthyl- | O | H | CH$_2$=CH—CH$_2$—O—CH$_2$— | | 20 | —SO$_3^-$NH$_4^+$ |

TABLE 1-continued

The function groups of the polyethylene oxide derivatives A-1 to A15

| Compound | $R^1$ | Z | $R^2$ | $R^3$ | a | Y |
|---|---|---|---|---|---|---|
| A-3 | 4-nonylphenyl- | O | H | $CH_2\!=\!CH\!-\!CH_2\!-\!O\!-\!CH_2\!-\!$ | 20 | $-SO_3^-NH_4^+$ |
| A-4 | 4-nonylphenyl- | O | H | $CH_2\!=\!CH\!-\!CH_2\!-\!O\!-\!CH_2\!-\!$ | 10 | $-SO_3^-NH_4^+$ |
| A-5 | 4-nonylphenyl- | O | H | $CH_2\!=\!CH\!-\!CH_2\!-\!O\!-\!CH_2\!-\!$ | 20 | $-COCH_2CH_2\!-\!COO^-Na^+$ |
| A-6 | $CH_2\!=\!CH\!-\!CH_2\!-\!$ | O | H | phenyl | 20 | $-SO_3^-NH_4^+$ |
| A-7 | $CH_2\!=\!CH\!-\!CH_2\!-\!$ | O | phenyl | phenyl | 25 | $-PO_3^{2-}(Na^+)_2$ |
| A-8 | 2-allylphenyl- | O | H | $CH_2\!=\!CH\!-\!CH_2\!-\!O\!-\!CH_2\!-\!$ | 20 | $-SO_3^-NH_4^+$ |
| A-9 | 4-nonyl-2-propenyl-phenyl- | O | H | H | 20 | $-SO_3^-NH_4^+$ |
| A-10 | 4-nonyl-2-propenyl-phenyl- | O | H | H | 50 | $-SO_3^-NH_4^+$ |
| A-11 | 4-nonylphenyl- | O | H | $CH_2\!=\!CH\!-\!CH_2\!-\!O\!-\!CH_2\!-\!$ | 20 | $-CH_3$ |
| A-12 | 4-nonylphenyl- | O | H | H | 20 | $-SO_3^-NH_4^+$ |
| A-13 | $CH_2\!=\!CH\!-\!CH_2\!-\!$ | O | H | phenyl | 5 | $-SO_3^-NH_4^+$ |
| A-14 | $C_{16}H_{33}$ (straight chain) | O | H | H | 10 | $-SO_3^-NH_4^+$ |
| A-15 | 4-nonyl-2-propenyl-phenyl- | O | H | H | 110 | $-SO_3^-NH_4^+$ |

1. Blending and Mixing of Concrete

Concrete with a target slump of 18±1 cm was prepared according to the mixing ratio given in Table 2.

The respective materials were weighed so as to result in a mixed amount of 80 liters, the materials were then charged into a 100 liter pan-type forced mixer and mixed for 120 seconds; the amount of air in the concrete thus prepared was then measured and the performance of the defoaming agent was evaluated based on the variation in the amount of air.

TABLE 2

Concrete mixing ratio

| | | Unit (kg/m³) | | | | |
|---|---|---|---|---|---|---|
| Water/cement ratio (%) | Fine aggregate ratio (%) | Mixing water | Cement | Fine aggregate | Coarse aggregate | Admixture |
| 50.0 | 49.0 | 165 | 320 | 878 | 931 | 3.2 |

As admixture, only a polycarboxylate-type water-reducing agent that had been mixed with a defoaming agent for cement compositions at a ratio of 2 g of defoaming agent for cement compositions for 1000 g of polycarboxylate-type water-reducing agent was used.

(Materials Used)

Cement: Normal Portland cement with a density of 3.16 produced by Taiheiyo Cement Corporation Fine aggregate: Oigawa river sand with a density of 2.59

Coarse aggregate: Crushed stones from Ome with a density of 2.65

Admixture: Polycarboxylate type water-reducing agent
    P-1: RHEOBUILD (trade mark) SP8SE of NMB Co., Ltd.
    P-2: RHEOBUILD SP8RE of NMB Co., Ltd.

Nonionic defoaming agent: B-1: PLURONIC (trade mark) type L-61 of BASF
    B-2: PLONAL (trade mark) 753 of Toho Chemical Industry Co., Ltd.
    B-3: SN Defoamer 170 of Sannopco Co., Ltd.

(Solution Stability)

In order to confirm the solution stability of the defoaming agent for cement compositions according to the present invention, 2.0 g of defoaming agent for cement compositions was dissolved in 1000 g of carboxylate-type water-reducing agent and left standing for 3 months in an environment at room temperature, after which the segregation of a solution was observed.

The result was evaluated according to the following criteria:

A⁺: very good (absolutely no segregation)

A: good (almost no segregation)

B: segregation (Defoaming Performance)

In order to confirm the defoaming performance of the defoaming agents for cement compositions according to the present invention, concrete was prepared as shown below; the defoaming performance was evaluated by comparing the amount of air in the concrete for cases in which a defoaming agent for cement compositions was used with that for cases in which no such agent was used.

A: good defoaming performance (the amount of air was reduced by 2% or more)

B: no defoaming (the reduction in the amount of air was less than 2% or the amount of air increased)

The results are shown in Table 3.

TABLE 3

Test results

| | Defoaming agent for cement compositions | | | | | | |
|---|---|---|---|---|---|---|---|
| | Polyethylene glycol derivative | | Nonionic defoaming agent | | Polycarboxyate water-reducing agent | Solution stability | Amount of air | Defoaming performance |
| | Type | Mixing ratio (%) | Type | Mixing ratio (%) | | | | |
| Example | | | | | | | | |
| 1 | A-1 | 30 | B-1 | 70 | P-1 | A | 2.0 | A |
| 2 | A-1 | 50 | | 50 | P-1 | A | 1.9 | A |
| 3 | A-1 | 90 | | 10 | P-1 | A | 2.1 | A |
| 4 | A-2 | 50 | | 50 | P-1 | A | 2.0 | A |
| 5 | A-3 | 50 | | 50 | P-1 | A$^+$ | 1.8 | A |
| 6 | A-4 | 50 | | 50 | P-1 | A | 1.6 | A |
| 7 | A-5 | 50 | | 50 | P-1 | A | 1.8 | A |
| 8 | A-6 | 50 | | 50 | P-1 | A | 2.0 | A |
| 9 | A-7 | 50 | | 50 | P-1 | A | 1.9 | A |
| 10 | A-8 | 50 | | 50 | P-1 | A | 1.9 | A |
| 11 | A-9 | 50 | | 50 | P-1 | A$^+$ | 1.8 | A |
| 12 | A-10 | 50 | | 50 | P-1 | A | 1.8 | A |
| 13 | A-1 | 50 | B-2 | 50 | P-1 | A | 1.7 | A |
| 14 | A-1 | 50 | B-3 | 50 | P-1 | A | 2.0 | A |
| 15 | A-1 | 50 | B-1 | 50 | P-2 | A | 1.8 | A |
| Comparative Example | | | | | | | | |
| 1 | — | — | — | — | P-1 | — | 4.8 | — |
| 2 | — | — | B-1 | 100 | P-1 | B | 2.1 | A |
| 3 | A-11 | 50 | | 50 | P-1 | B | 2.0 | A |
| 4 | A-12 | | | | P-1 | B | 1.8 | A |
| 5 | A-13 | | | | P-1 | B | 1.8 | A |
| 6 | A-14 | | | | P-1 | B | 1.9 | A |
| 7 | A-15 | | | | P-1 | B | 2.0 | A |

From Table 3 it is clear that, compared to Comparative Examples 1-7 in which no defoaming agent for cement compositions according to the present invention was used, Examples 1-12 in which defoaming agents for cement compositions were used, which had been prepared from different types of polyethylene glycol derivatives at different mixing ratios, and Examples 13-15 in which a defoaming agent for cement compositions was used with different nonionic defoaming agents all showed excellent solution stability without segregation and a sufficient degree of defoaming performance.

No defoaming performance was obtained in Comparative Example 1 in which no defoaming agent was used. In Comparative Examples 2-7, even though the defoaming agents for cement compositions mixed with polyethylene glycol derivatives showed adequate defoaming performance, segregation occurred and the solution stability was not adequate.

Comparison of the Examples with the Comparative Examples confirms that an overall improvement in solution stability and defoaming performance etc. is obtained by using a defoaming agent for cement compositions according to the present invention.

The invention claimed is:

1. A defoaming agent for cementitious compositions comprising a mixture of at least one polyethylene oxide derivative and at least one nonionic defoaming agent, wherein the polyethylene oxide derivative has at one end a hydrophobic group with at least one of a branched structure and an unsaturated bond, and at the other end an anionic group, wherein the polyethylene oxide derivative is a compound expressed by formula I:

wherein X is a hydrophobic group comprising a branched structure and an unsaturated bond; wherein the unsaturated bond is a double bond; Y is an anionic group; EO is —CH$_2$CH$_2$O— and a is an integer from 6 to 100.

2. The defoaming agent according to claim 1 wherein a is an integer from 15 to 60.

3. The defoaming agent according to claim 1, wherein the hydrophobic group is expressed by formula II:

wherein Z is O or an amine; R$^1$, R$^2$ and R$^3$ are each independently alkyl or phenyl, naphthyl, alkenyl, alkylene oxide with 2 to 4 carbon atoms or any derivatives thereof, and R$^2$ and R$^3$ may also be each independently H, with the proviso that R$^1$ is not alkyl when R$^2$ and R$^3$ are both H.

4. The defoaming agent according to claim 1, wherein the anionic group is —SO$_3$M, —C$_2$CH$_2$OSO$_3$M, —R$^4$COOM wherein R$^4$ is —C$_m$H$_{2m}$— in which m is an integer 10>m>0 or a phenyl group, —PO$_3$M or —COCH$_{2n}$COOM wherein M is Na salt, K salt, Ca salt, Mg salt, NH$_4$ salt or H, n is 2 or 3.

5. The defoaming agent according to claim 1 wherein the nonionic defoaming agent is expressed by formula III:

R$^5$O—(AO)$_b$—R$^6$ (III)

wherein R$^5$ and R$^6$ are each independently an aliphatic hydrocarbon with 10 to 25 carbon atoms, an alkyl group with 1 to 5 carbon atoms or H; AO is a block polymer and/or a random polymer constituted of alkylene oxide with 2 to 3 carbon atoms and b is an integer from 5 to 500.

6. The defoaming agent according to claim 1 wherein the polyethylene oxide derivative and the nonionic defoaming agent are at a ratio in the range of 20:80 to 60:40 (wt %).

7. The defoaming agent according to claim 5, wherein the nonionic defoaming agent, when converted to polyethylene glycol, has a weight average molecular weight in the range from 300 to 30,000 and the weight ratio of the ethylene oxide in said molecular weight is in the range of 5 to 80%.

8. A water-reducing composition comprising a blend of a polycarboxylate-high performance air-entraining (AE) water-reducing agent and a defoaming agent for cementitious compositions comprising a mixture of at least one polyethylene oxide derivative and at least one nonionic defoaming agent, wherein the polyethylene oxide derivative has at one end a hydrophobic group with at least one of a branched structure and an unsaturated bond, and at the other end an anionic group, wherein the unsaturated bond is optionally a double bond.

9. A method of defoaming a cementitious composition by the addition to the composition of a defoaming agent according to claim 1.

10. The defoaming agent of claim 4 wherein m is 1 or 2.

11. A defoaming agent for cementitious compositions comprising a mixture of at least one polyethylene oxide derivative and at least one nonionic defoaming agent, wherein the polyethylene oxide derivative has at one end a hydrophobic group with at least one of a branched structure and an unsaturated bond, and at the other end an anionic group, wherein the unsaturated bond is optionally a double bond, wherein the hydrophobic group comprising at least one of a branched structure and an unsaturated bond is expressed by formula II:

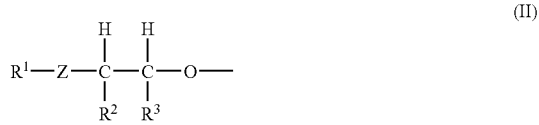

wherein Z is O or an amine; R$^1$, R$^2$ and R$^3$ are each independently alkyl or phenyl, naphthyl, alkenyl, alkylene oxide with 2 to 4 carbon atoms or any derivatives thereof, and R$^2$ and R$^3$ may also be each independently H, with the proviso that R$^1$ is not alkyl when R$^2$ and R$^3$ are both H.

12. The defoaming agent according to claim 11, wherein the anionic group is —SO$_3$M, —CH$_2$CH$_2$OSO$_3$M, —R$^4$COOM wherein R$^4$ is —C$_m$H$_{2m}$— in which m is an integer 10>m>0 or a phenyl group, —PO$_3$M or —COCH$_{2n}$COOM wherein M is Na salt, K salt, Ca salt, Mg salt, NH$_4$ salt or H, n is 2 or 3.

13. The defoaming agent of claim 12 wherein m is 1 or 2.

14. The defoaming agent according to claim 11, wherein the nonionic defoaming agent is expressed by formula III:

R$^5$O—(AO)$_b$—R$^6$ (III)

wherein R$^5$ and R$^6$ are each independently an aliphatic hydrocarbon with 10 to 25 carbon atoms, an alkyl group with 1 to 5 carbon atoms or H; AO is a block polymer and/or a random polymer constituted of alkylene oxide with 2 to 3 carbon atoms and b is an integer from 5 to 500.

15. A water-reducing composition comprising a blend of a polycarboxylate-type high performance air-entraining (AE) water-reducing agent and a defoaming agent according to claim 11.

16. A method of defoaming a cementitious composition by the addition to the composition of a defoaming agent according to claim 11.

17. The defoaming agent according to claim 2, wherein the hydrophobic group is expressed by formula II:

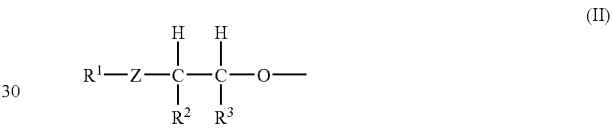

wherein Z is O or an amine; R$^1$, R$^2$ and R$^3$ are each independently alkyl or phenyl, naphthyl, alkenyl, alkylene oxide with 2 to 4 carbon atoms or any derivatives thereof, and R$^2$ and R$^3$ may also be each independently H, with the proviso that R$^1$ is not alkyl when R$^2$ and R$^3$ are both H.

18. The defoaming agent according to claim 2, wherein the anionic group is —SO$_3$M, —(C$_2$CH$_2$)OSO$_3$M, —R$^4$COOM (wherein R$^4$ is —C$_m$H$_{2m}$— (in which m is an integer 10>m>0) or a phenyl group), —PO$_3$M or —CO(CH$_2$)$_n$COOM (wherein M is Na salt, K salt, Ca salt, Mg salt, NH$_4$ salt or H, n is 2 or 3).

19. The defoaming agent according to claim 2 wherein the nonionic defoaming agent is expressed by formula III:

R$^5$O—(AO)$_b$—R$^6$ (III)

wherein R$^5$ and R$^6$ are each independently an aliphatic hydrocarbon with 10 to 25 carbon atoms, an alkyl group with 1 to 5 carbon atoms or H; AO is a block polymer and/or a random polymer constituted of alkylene oxide with 2 to 3 carbon atoms and b is an integer from 5 to 500.

20. A water-reducing composition comprising a blend of a polycarboxylate-type high performance air-entraining (AE) water-reducing agent and a defoaming agent according to claim 1.

* * * * *

UNITED STATES PATENT AND TRADEMARK OFFICE
CERTIFICATE OF CORRECTION

PATENT NO. : 7,662,882 B2 Page 1 of 1
APPLICATION NO. : 10/534606
DATED : February 16, 2010
INVENTOR(S) : Lorenz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this

Thirtieth Day of November, 2010

David J. Kappos
*Director of the United States Patent and Trademark Office*